March 27, 1956
K. MAYBACH
2,739,854
SCREW CONNECTION FOR PISTONS
Filed June 13, 1952
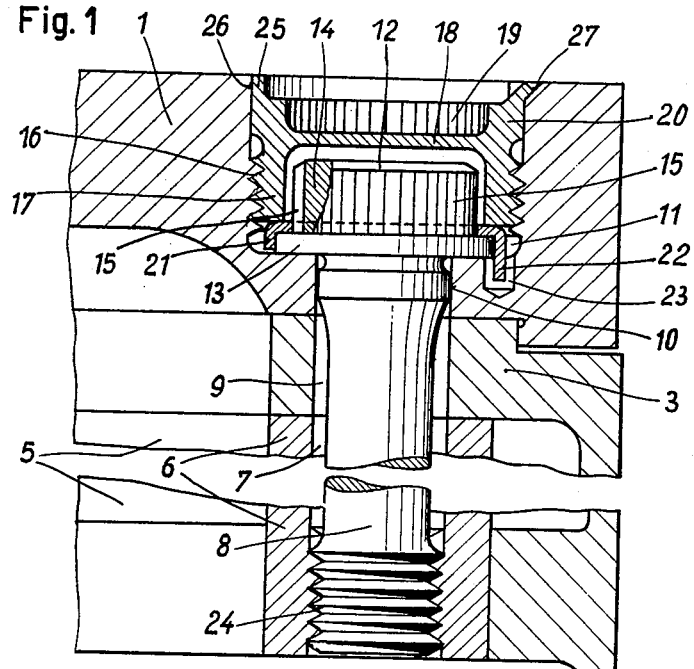
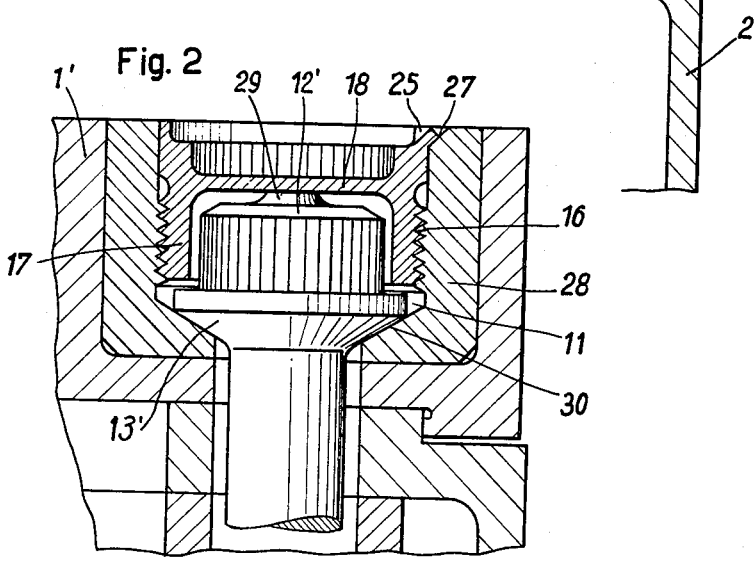
INVENTOR:
KARL MAYBACH
BY K. B. May
ATTORNEY.

United States Patent Office 2,739,854
Patented Mar. 27, 1956

2,739,854

SCREW CONNECTION FOR PISTONS

Karl Maybach, Friedrichshafen am Bodensee, Germany, assignor to Maybach-Motorenbau G. m. b. H., Friedrichshafen, Germany, a firm of Germany Application June 13, 1952, Serial No. 293,267

Claims priority, application Germany June 15, 1951

3 Claims. (Cl. 309—15)

This invention relates to the construction of a screw connection for pistons of internal combustion engines made up of several individual parts, the construction being of particular advantage in engines for motor vehicles.

Such screw connections are unreliable and failures may occur due to distortion and parching of the connecting bolts because of the great heat to which they are exposed. The space required by such screw connections may cause, under certain conditions, an unfavorable shape of the piston head or of the compression space.

A conventional screw connection of the individual piston parts can be disconnected only in the workshop when the piston is taken out of the cylinder because only then is it possible to loosen parched screws and to take the piston apart.

The screw connection for pistons made up of individual parts according to the present invention makes it possible to inspect a piston without disassembling the entire internal combustion engine. This is of special value when the periods between general inspections are long, for instance in the case of Diesel engine locomotives, which, because of adequate division of the piston into several individual parts, afford intermediate inspections simply by taking off the cylinder head without taking the motor out of the vehicle and taking it apart.

The aforestated object of the invention is obtained in the following manner: The head of the connecting bolt is received in a recess or cavity in the piston head and is grooved or splined to fit a correspondingly grooved key. To protect the bolt head, a cap covering it and screwed into the cavity for the head is provided, the top of the cap having an axially grooved cylindrical surface adapted to receive a suitable key. According to the invention a collar or ring is provided on the upper part of the cap for protecting the screw connection between the cap and the cavity. Thus the delicate parts, especially the thread on the cap, are protected against the effects of high temperatures in the combustion chamber.

For protection against undesired loosening of the cap, according to the invention, one or several recesses are provided in the rim of the cavity for the bolt head into which recesses the ring on the upper part of the cap may easily be bent. Furthermore for preventing loosening of the connecting bolt a guard or lock ring is provided, having interior projections extending into the grooves on the bolt head and having a projection fitting into a recess in the cavity of the piston head and being pressed thereinto by means of the cap. To facilitate removal of the lock ring for disassembly of the piston some of the interior projections of the ring may be omitted for producing gaps into which a suitable tool may be inserted. Another effective protection against loosening of the connecting bolt may be provided by pressing the cap against the bolt head or against an axial protuberance thereof when the cap is screwed into the cavity in the piston head.

If the piston head is made of relatively soft material such as aluminum, for instance, which requires a larger surface of contact between the bolt head and the piston head and which is not suitable for frequent disassembly, a bushing made of relatively hard material, for example steel, is pressed into the cavity of the piston head.

The screw connection according to the invention preferably comprises a plurality of connecting bolts arranged in a circle.

The screw connection according to the invention affords protection of the movable portions of the screw not only against loosening during operation but also against injurious effects of the high temperatures in the combustion space. The bolt can be inserted and removed in a simple manner and impairs the shape of the combustion space or of the piston head only in a very small degree.

The two figures of the drawing represent modifications of arrangements according to the invention on a piston of a motor vehicle, shown mostly in section and diagrammatically. The head of the piston is designated by numeral 1, the piston skirt 2 having a flange 3 at its upper end. 5 is a carrier for and enclosing the piston pin, not represented, and being provided with eyes 6. In the bore 7 of the eye 6 a connecting bolt 8 is inserted which is made fast in the lower portion of the eye by means of a thread 24. The bolt 8 is of the tension type, its length being at least four times the length of the thread 24 and the diameter of the shaft of the bolt being not greater than the interior diameter of the thread 24. Bore 9 in flange 3 receives the bolt 8, bore 10 in top portion 1 snugly fittingly receiving a collar on the shaft of the bolt. A cavity 11 in the piston head receives the bolt head 12. The latter has a flange 13 below a head portion 14 having axial grooves 15. Bore or cavity 11 is provided with a screw thread 16 into which a cap 17 is screwed having a bottom 18. Above this bottom 18 axial interior grooves 19 are provided inside of a cylindrical portion or ring 20. The outermost portion 26 of bore 11 has a recess 27. A lock ring 21 has interior teeth fitting into the grooves 15. The ring 21 has an extension 22 which fits into a recess 23 at the bottom of the cavity 11.

The ring-shaped extension 20 of cap 17 has a thin-walled outer end portion 25 having a somewhat larger diameter than bore portion 26 so that the cap is screwed into the cavity with tension and fits elastically into the bore portion 26. The portion may be made slightly conical and may, if desired, be hammered or swaged into recess 27, thus causing not only a good tight joint but also a reliable safeguard against involuntary loosening of cap 17.

The protection against involuntary loosening of the bolt is obtained by the guard ring 21, which, at its inner circumference, is provided with teeth corresponding in shape to grooves 15. Projection 22 connected to guard ring 21 fits into a bore 23 in the piston head. The lock ring 21 is secured in its axial position by the pressure of cap 17.

In Fig. 2 wherein parts corresponding to those of Fig. 1 bear the same numerals, a modification is represented in which the bolt head 12' and the cap 17 are situated inside of an inserted bush 28. This bush is pressed into the piston head 1' and is provided with a screw thread 16 for cap 17 as well as with a recess 27 for securing the cap. For securing the bolt in position its head 12 bears against cap 17. An axial protuberance 29 may be provided on the head against which the bottom 18 of the cap abuts. The contact surface of the projection 29 is made as small as possible for throttling the exchange of heat at this spot. The same construction for securing the bolt may be used in connection with the modification shown in Fig. 1, instead of the lock ring 21. A conical seat 30 may be provided for the bolt head in both modifications.

The construction according to Fig. 2 is used with advantage only in pistons in which the material of the piston head (for instance aluminum) requires an enlarged contact surface for the bolt head and which material is not suitable for a screw connection of cap 7 with the piston head. Bush 28 is made of suitably hard material, for instance steel. It affords sufficient contact surface for the screw connection without enlarging the flange 13' of the bolt. Cap 17, when exchanging individual piston parts, may be screwed out and in again as often as wanted without wearing out the screw thread 16.

The invention in its principles may equally be applied also to screw connections in which the upper portion of the connecting bolt is provided with a screw thread and nut.

I claim:

1. A piston for an internal combustion engine comprising a piston head part and a skirt part, a plurality of bolts for connecting said parts; each of said bolts having a threaded end portion screwed into said skirt part and a bolt head having an axial protuberance; a plurality of cavities in said piston head part for individually receiving said bolt heads, a plurality of cap members individually screwed into said cavities and individually covering and abutting against the axial protuberance of said bolt heads.

2. A piston for an internal combustion engine comprising a piston head part and a skirt part, a plurality of bolts for connecting said parts; each of said bolts having a threaded end portion screwed into said skirt part and a bolt head; a cavity in said piston head for each of said bolt heads, a bushing inserted in each of said cavities for receiving one of said bolt heads, said bushing being made of a material harder than the material of which said head part is made, and a cap member screwed in each of said bushings for covering a bolt head.

3. A piston as defined in claim 2 in which said bushing has an interior flange and each of said bolt heads has collar for pressing said flange against the bottom of the cavity in which it is inserted.

References Cited in the file of this patent

UNITED STATES PATENTS

| | | |
|---|---|---|
| 1,368,938 | Kecskemety | Feb. 15, 1921 |
| 1,376,705 | Kottusch | May 3, 1921 |
| 1,377,346 | Hauer | May 10, 1921 |
| 1,522,458 | Jackson et al. | Jan. 6, 1925 |
| 1,553,548 | Nagel | Sept. 15, 1925 |
| 1,636,542 | Willis | July 19, 1927 |
| 1,842,910 | Lister | Jan. 26, 1932 |
| 2,004,618 | Schmidt | June 11, 1935 |
| 2,093,594 | Wild et al. | Sept. 21, 1937 |
| 2,163,803 | Orris | June 27, 1939 |
| 2,599,082 | Wells | June 3, 1952 |

FOREIGN PATENTS

| | | |
|---|---|---|
| 467,301 | Canada | Aug. 15, 1950 |